US011006119B1

(12) United States Patent
Brailovskiy

(10) Patent No.: US 11,006,119 B1
(45) Date of Patent: May 11, 2021

(54) COMPRESSION ENCODING OF IMAGES

(71) Applicant: Amazon Technologies, Inc., Seattle, WA (US)

(72) Inventor: Ilya Vladimirovich Brailovskiy, Los Gatos, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 44 days.

(21) Appl. No.: 16/382,587

(22) Filed: Apr. 12, 2019

Related U.S. Application Data

(63) Continuation of application No. 15/369,765, filed on Dec. 5, 2016, now Pat. No. 10,264,265.

(51) Int. Cl.
| | |
|---|---|
| H04N 19/136 | (2014.01) |
| H04N 19/91 | (2014.01) |
| H04N 19/124 | (2014.01) |
| H04N 19/423 | (2014.01) |
| H04N 19/182 | (2014.01) |
| H04N 19/184 | (2014.01) |
| H04N 19/186 | (2014.01) |
| H04N 19/176 | (2014.01) |

(52) U.S. Cl.
CPC ......... *H04N 19/136* (2014.11); *H04N 19/124* (2014.11); *H04N 19/176* (2014.11); *H04N 19/182* (2014.11); *H04N 19/184* (2014.11); *H04N 19/186* (2014.11); *H04N 19/423* (2014.11); *H04N 19/91* (2014.11)

(58) Field of Classification Search
CPC .. H04N 19/136; H04N 19/176; H04N 19/182; H04N 19/186
See application file for complete search history.

(56) References Cited

U.S. PATENT DOCUMENTS

| | | | |
|---|---|---|---|
| 5,434,623 A * | 7/1995 | Coleman | H04N 5/9264 348/27 |
| 6,445,870 B1 * | 9/2002 | Abe | H04N 1/644 348/396.1 |
| 8,402,494 B1 | 3/2013 | Hu et al. | |

(Continued)

OTHER PUBLICATIONS

Author Unknown, "Indexed Color" Available at: https://en.wikipedia.org/w/index.php?title=Indexed_color&oldid=751112214; 8 pages; (Dec. 5, 2016).

(Continued)

*Primary Examiner* — Ruiping Li
(74) *Attorney, Agent, or Firm* — K&L Gates LLP

(57) ABSTRACT

Techniques are generally described for compression encoding of images. In various examples, the techniques may comprise receiving image data. In some examples, the techniques may further comprise generating a first compressed representation of luminance values of the image data by encoding luminance values of the image data with reference to a luminance palette. In some examples, the techniques may further include generating a second compressed representation of chrominance values of the image data by applying a frequency domain based image transform to the chrominance values of the image data. In various further examples, the techniques may further comprise combining the first compressed representation and the second compressed representation to generate compressed image data.

20 Claims, 5 Drawing Sheets

(56) References Cited

U.S. PATENT DOCUMENTS

| | | |
|---|---|---|
| 9,131,110 B2 | 9/2015 | Yassur et al. |
| 9,854,270 B2 | 12/2017 | Ramasubramonian et al. |
| 2003/0138047 A1 | 7/2003 | Orchard et al. |
| 2004/0001547 A1 | 1/2004 | Mukherjee |
| 2005/0012647 A1 | 1/2005 | Kadono et al. |
| 2006/0188025 A1 | 8/2006 | Hannuksela |
| 2009/0003440 A1 | 1/2009 | Karczewicz et al. |
| 2010/0118972 A1 | 5/2010 | Zhang et al. |
| 2010/0166058 A1 | 7/2010 | Perlman et al. |
| 2010/0309987 A1 | 12/2010 | Concion et al. |
| 2011/0135198 A1 | 6/2011 | Schuler |
| 2012/0185570 A1 | 7/2012 | Bouazizi et al. |
| 2013/0089142 A1 | 4/2013 | Begen et al. |
| 2014/0082054 A1 | 3/2014 | Denoula et al. |
| 2014/0254669 A1 | 9/2014 | Rapaka et al. |
| 2015/0049806 A1 | 2/2015 | Choi et al. |
| 2015/0085927 A1 | 3/2015 | Sjoberg et al. |
| 2015/0139325 A1 | 5/2015 | Chuang et al. |
| 2015/0334420 A1 | 11/2015 | De Vleeschauwer et al. |
| 2016/0150236 A1 | 5/2016 | Maeda et al. |
| 2016/0191931 A1 | 6/2016 | Hannuksela |
| 2016/0330453 A1 | 11/2016 | Zhang et al. |
| 2017/0359596 A1 | 12/2017 | Kim et al. |

OTHER PUBLICATIONS

Author Unknown, "Entropy Encoding" Available at: https://en.wikipedia.org/w/index.php?title=Entropy_encoding&oldid=745326257; 2 pages (printed Dec. 5, 2016).

Author Unknown, "Block-matching Algorithm" Available at: https://en.wikipedia.org/wiki/Block-matching_algorithm; 7 pages; (Jun. 28, 2017).

Author Unknown, "Macroblock" Available at: https://en.wikipedia.org/wiki/Macroblock; 3 pages; (May 7, 2017).

Author Unknown, "Adaptive Bitrate Streaming" Available at: https://en.wikipedia.org/wiki/Adaptive_bitrate_streaming; 4 pages; (Nov. 8, 2016).

Author Unknown, "H.264/MPEG-4 AVC" Available at: https://en.wikipedia.org/wiki/H.264/MPEG-4_AVC; 15 pages; (Oct. 11, 2016).

* cited by examiner

COMPRESSION ENCODING OF IMAGES

CROSS-REFERENCE TO RELATED APPLICATIONS

This application is a continuation of U.S. patent application Ser. No. 15/369,765, filed Dec. 5, 2016, the contents of which are incorporated herein by reference.

BACKGROUND

Electronic devices are commonly used to display image and video content. In some cases, image and/or video content may be sent between one or more electronic devices via a communication network and is typically compressed for this transmission.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Figure 1:
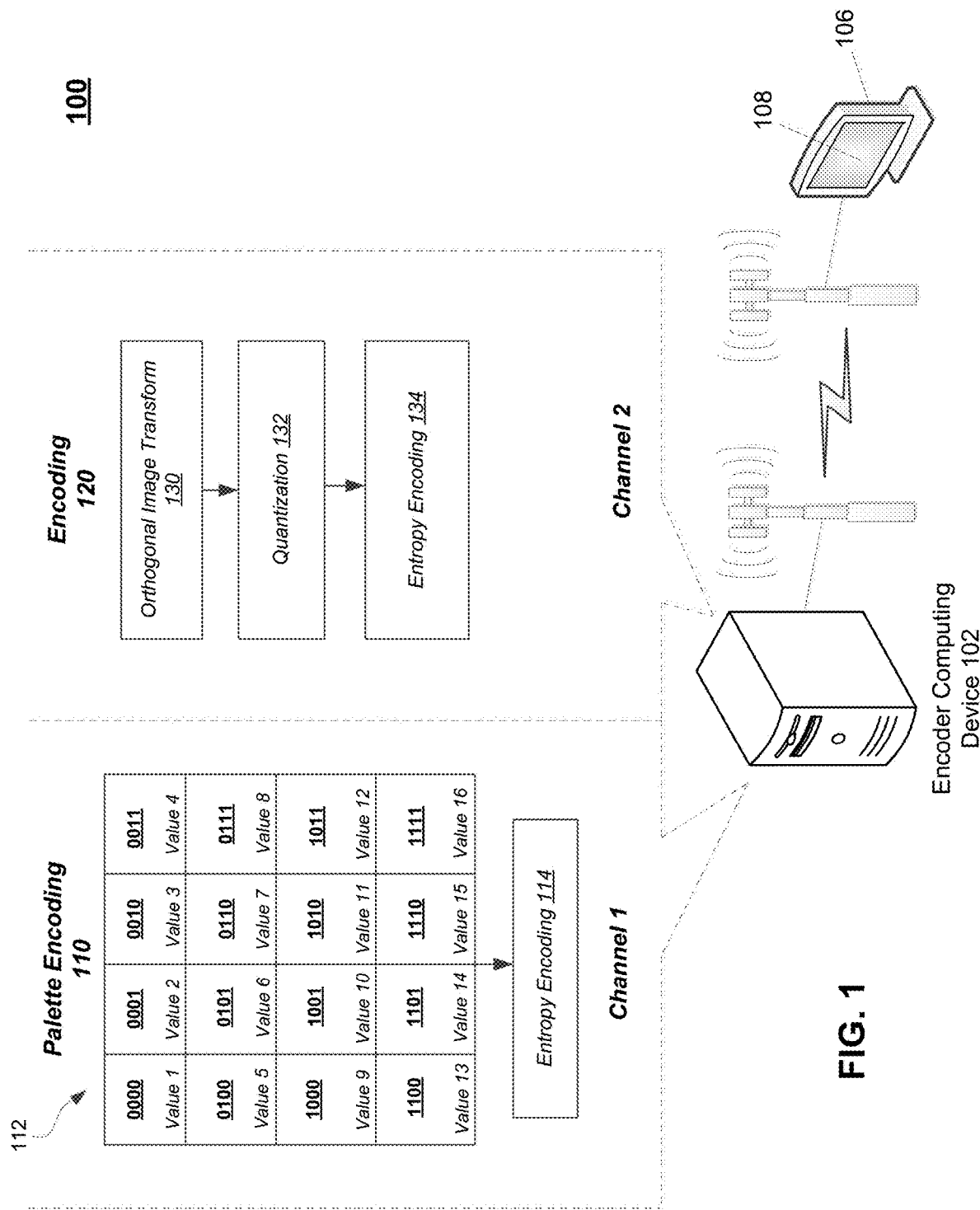
FIG. 1 is a diagram illustrating an example system for hybrid compression encoding of image data that may be used in accordance with embodiments of the present disclosure.

In the following description, reference is made to the accompanying drawings, which illustrate several embodiments of the present disclosure. It is to be understood that other embodiments may be utilized and system or process changes may be made without departing from the spirit and scope of the present disclosure. The following detailed description is not to be taken in a limiting sense, and the scope of the embodiments of the present invention is defined only by the claims of the issued patent. It is to be understood that drawings are not necessarily drawn to scale.

Electronic devices are increasingly used to display content, such as images and videos. Image data may be comprised of rows and columns of pixels. A pixel may be an individually addressable unit of the image data (which, as used herein, is intended to be broad and includes video data and/or any other type of data used to render graphics). The resolution of a particular frame of image data may be described by the width of the frame, in terms of a first number of pixels; and by the height of the frame, in terms of a second number of pixels. As the resolution of the content increases, corresponding sizes of the data representing the content and the bandwidth required to broadcast, send, and/or stream the data representing the content over a communication network increases accordingly. Due to storage and transmission limitations, it is beneficial to reduce the size of the content and/or the bandwidth required to broadcast/stream the content, which may be accomplished by encoding the content. The human visual system is more sensitive to variations in brightness (e.g., luminance) than color (e.g., chrominance). As described in further detail below, the variation in human sensitivity to chrominance and luminance can be leveraged to compress image data. One technique for encoding chrominance and/or luminance values of an image is palette encoding.

In palette encoding, image data may be stored in a data structure referred to as a "palette." Instead of encoding luminance and/or chrominance values directly as pixel data, the pixel data instead includes a reference to an index value in the palette. The palette may store luminance and/or chrominance values, depending on the channel of the image data being encoded. Accordingly, at the pixel level, the pixel data need only store an index value that points to a corresponding element in the palette. Typically, the index value stored in pixel data requires a smaller number of bits relative to the chrominance and/or luminance value stored in the palette and pointed to by the index value of the pixel data.

For example, in RGB (Red/Green/Blue) "truecolor" encoding, 24 bits may be used to represent color data for a particular pixel. If the full RGB palette is 24 bit truecolor, 16,777,216 different colors are possible. By contrast, in palette encoding, a palette may include a smaller number of colors to be used to represent a particular image to be encoded. For example, a palette may be an array including 16 chrominance values, with each chrominance value being associated with an index value of the array. Each pixel of the image data to be encoded may store an index value pointing to a position in the array. The position in the array stores a chrominance value corresponding to the index value. In the example, the encoding may result in a net compression of 20 bits per pixel, as the index may be represented using only 4 bits, whereas truecolor encoding of the pixel's color may require 24 bits. In some cases, techniques such as color quantization, anti-aliasing, and dithering may be employed to further approximate the colors in the original image data using the limited number of chrominance values in the palette. In various further examples, the chrominance values of the palette may be selected using an adaptive palette algorithm by sampling chrominance values from the original image data. Additionally, adaptive palette algorithms and/or other palette encoding algorithms may be effective to represent chrominance values of the original image data by the index value corresponding to the palette chrominance value that most closely approximates the chrominance value from the original image data.

FIG. 1 depicts an example system 100 for hybrid compression encoding of image data that may be used in accordance with the present disclosure. System 100 may include an encoder computing device 102 effective to encode one or more images and/or videos in accordance with the techniques described herein. In various examples, images and/or videos encoded by encoder computing device 102 may be captured by an imaging device, such as a camera, or may be received as image data already encoded in a first format. Encoder computing device 102 may include a processor and a memory in communication with the processor. Encoder computing device 102 may be any variety of computing device, including, for example, a tablet computer, a laptop or other mobile computing device, a smart phone, a desktop computing device, a wearable computing device, etc. In some examples, system 100 may include a device 106, such as a television, having a display 108. However, the present disclosure is not limited thereto and the device 106 may be any electronic device, including a processor, for example, a device without a built-in display that receives image signals and sends them to a separate device for display. As illustrated in FIG. 1, the encoder computing device 102 may send content to the device 106 to be displayed on display 108. Prior to sending the content, the encoder computing device 102 may encode the content using the hybrid compression techniques described herein to reduce the size of the content for storage and for transmission between encoder computing device 102 and device 106.

Encoder computing device 102 may receive and/or identify image data and may separate Y/U/V signals of the image data. For example, if encoder computing device 102 acquires the content as an RGB signal, encoder computing device 102 may convert the RGB signal to a Y/U/V signal having separate Y/U/V components. The luminance data (e.g., Y components) may be calculated using each of the Red, Green, and Blue signals, whereas the chrominance data (e.g., U/V components) may be calculated using the luminance signal and either the Red signal or the Blue signal. For example, U components may be calculated based on a difference between the Y components and the Blue signals, whereas the V components may be calculated based on a difference between the Y components and the Red signals.

As depicted in FIG. 1, encoder computing device 102 may use a hybrid approach for compression encoding of image data. For a first channel of image data, denoted in FIG. 1 as "Channel 1", palette encoding 110 and/or entropy encoding 114 may be used to encode Channel 1 pixel data. For a second channel of image data, denoted in FIG. 1 as "Channel 2", an encoding 120 including an orthogonal image transform 130, a quantization process 132, and/or entropy encoding 134 may be used to encode Channel 2 pixel data. In the examples described herein, a channel, such as Channel 1 and/or Channel 2, may refer to components of the image data. For example, Channel 1 may be the chrominance channel of image data (e.g., the UV channel), and Channel 2 may be the luminance channel of image data (e.g., the Y channel). The chrominance channel describes the color of the image data. The luminance channel describes the luminous intensity of the image data, perceivable as brightness of the resulting decoded image, when rendered on a display such as display 108.

Encoder computing device 102 may encode a first channel of image data using palette encoding 110 and/or entropy encoding 114. In the example depicted in FIG. 1, encoder computing device 102 may generate a palette 112. Palette 112 may be an array comprising any number of elements. In the example palette depicted in FIG. 1, 16 elements are included, though a larger or smaller array may be used in various other examples. For example, a particular palette may include $2^x$ elements, where x is an integer, such that the elements of the array may be encoded in binary. The indexes of palette 112 depicted in FIG. 1 are encoded using 4 bits (e.g., from 0000 to 1111). As shown, each index value is associated with a stored value, such as Value 1, Value 2, . . . , Value 16. For example, index 0000 is associated with Value 1, index 0001 is associated with Value 2, and so on. Value 1, Value 2, . . . , Value 16 represent values of image data associated with the particular channel that is being encoded using palette encoding 110. For example, if Channel 1 represents the chrominance channel of the image data being encoded, Value 1, Value 2, . . . , Value 16, represent chrominance values for the image data. Each pixel in an image or in a portion of an image may be encoded with an index value to associate the pixel with a chrominance value encoded in palette 112. Accordingly, the chrominance values of the pixels of image data may be encoded by representing the chrominance value of each pixel with an index value corresponding to a position in palette 112. Such a compressed representation of the chrominance values of the pixels of the image data may include fewer bits, relative to the uncompressed image data.

In various examples, chrominance values of palette 112 may be chosen according to the most representative colors of the image (or portion of the image) being encoded by encoder computing device 102. Chrominance values of palette 112 may be chosen for the entire image being encoded or for portions of the image being encoded. When encoding video, chrominance values of palette 112 may be chosen for segments of the video, rather than for each image frame.

Similarly, if Channel 1 represents the luminance channel of the image data being encoded, Value 1, Value 2, . . . , Value 16, represent luminance values for the image data. Each pixel may be encoded with an index value to associate the pixel with a luminance value encoded in palette 112. Accordingly, the luminance values of the pixels of image data may be encoded by representing the luminance value of each pixel with an index value corresponding to a position in palette 112. Such a compressed representation of the luminance values of the pixels of the image data may include fewer bits, relative to the uncompressed image data.

In various examples, luminance values of palette 112 may be chosen according to the most representative luminous intensities of the image being encoded by encoder computing device 102. Luminance values of palette 112 may be chosen for the entire image being encoded or for portions of the image being encoded. When encoding video, luminance values of palette 112 may be chosen for segments of the video, rather than for each image frame.

Entropy encoding 114 may be used to further compress the number of bits required to represent index values of palette 112 in the compressed pixel data resulting from palette encoding 110. For example, binary arithmetic encoding and/or Huffman encoding can be employed to reduce the number of bits necessary to represent the index values in the compressed image data resulting from palette encoding 110.

Generally, entropy encoding may include representing symbols included in the data input into the entropy encoding algorithm ("input data") using fixed-length input codewords (i.e., fixed in terms of a number of bits). A symbol may be, for example, a unique, fixed-length value appearing one or more times in the input data. For example, input data ABBACCAACCAAAA may include symbols A, B, and C. Symbol A may be represented by the fixed-length input codeword "000". Symbol B may be represented by the fixed-length codeword "001". Symbol C may be represented by the fixed-length codeword "010". The input codewords may be represented by the entropy encoding algorithm using variable-length output codewords. In general, the length (in terms of a number of bits) of the variable-length output codewords may be approximately proportional to the negative logarithm of the probability of the symbol appearing in the input data. Therefore, symbols of the input data that are repeated the greatest number of times may be represented in the output data using the shortest output codewords, in terms of a number of bits. To continue the above example, the variable-length output codeword for symbol A may be "1"

(i.e., requiring only a single bit), as symbol A appears more often in the input data relative to symbols B and C. Similarly, symbols B and C may be represented by output codewords including a number of bits that is based at least in part on the number of times that symbols B and C are repeated in the input data.

In arithmetic entropy encoding, such as binary arithmetic entropy encoding, the input data is represented by a fraction n, where [$0.0 \leq n \leq 1.0$]. Individual symbols of the input data are represented by intervals based on the symbol's probability of occurring in the input data. For example, a symbol "01" of input data may represent a common symbol within the input data. Such a symbol may be represented by the interval [0, 0.6]. All intervals of the input data may be combined to generate a resultant interval that unambiguously identifies the sequence of symbols that were used to generate the resultant interval. The resultant interval may be represented as a fraction typically using a lesser number of bits relative to the input data.

Although palette encoding may be used for both the luminance and chrominance channels to encode and compress image data, in some examples, it may be advantageous to use palette encoding 110 to encode a first channel of image data and an encoding technique 120 to encode a second channel of image data.

Encoding technique 120 may comprise an orthogonal image transform 130, a quantization process 132, and/or an entropy encoding process 134. Examples of orthogonal image transform 130 may include frequency domain based image transforms such as, for example, a discrete cosine transform (DCT), a Fourier transform, a Hadamard transform, or another "lossy" or lossless image transform used to represent the image data in the frequency domain. In DCT, coefficients of different frequency cosine waves are calculated based on the contribution of the different frequency cosine waves to the portion of the image being encoded. After subjecting image data to a DCT, the lower frequency cosine wave coefficients are typically much larger relative to the higher frequency cosine wave coefficients. This is due to the higher frequency cosine waves typically having a less significant impact (i.e., the higher frequency cosine waves contribute less to the image or portion of the image) on the image being encoded and the lower frequency cosine waves having a more significant impact on the image being encoded. The coefficients of the different frequency cosine waves may be divided by quantization factors during quantization process 132 and rounded to the nearest integer, to further compress the data. In various examples, the quantization factors may be determined using a rate control algorithm. A rate control algorithm may solve an optimization problem to determine the number of bits that should be used to encode macroblocks of image data and/or a frame of image data at a given level of image quality and/or at a given level of distortion. In some other examples, a rate control algorithm may solve an optimization problem to determine a level of image quality at a given number of bits. Image quality may be determined using peak signal to noise ratio (PSNR) and/or structural similarity index (SSIM), for example.

After quantization process 132, several zero value coefficients are typically present in the high frequency cosine wave range of the compressed image data. The list of quantized coefficients can be serialized using, for example, a "zig zag" scan of the array of quantized coefficients. The serialized list of quantized coefficients can be further compressed using an entropy encoding process 134, such as binary arithmetic encoding or Huffman encoding, to reduce the number of bits necessary to represent the compressed image data. In various examples, the quantization factors used during quantization process 132 may be increased in order to further reduce the size of the compressed representation of image data resulting from encoding 120 in terms of a number of bits needed to represent the image data.

In an example, Channel 2 may be the chrominance (e.g., UV) channel of image data and Channel 1 may be the luminance (e.g., Y) channel. As human visual acuity is less sensitive to changes in colors and hues relative to changes in intensity, the quantization factors used during quantization process 132 may be increased to provide relatively coarse, highly compressed, chrominance image data. Palette encoding 110 may be used to encode the luminance values of the image data. The number of luminance values stored in the array of palette 112 may be chosen to provide an acceptable level of quality for the image data. In the example, the chrominance image data may be more highly compressed (i.e., may comprise a lesser number of bits) relative to the luminance image data.

In some examples, it may be beneficial to use palette encoding to encode chrominance and image transform techniques, such as DCT, to encode luminance for a given image. For example, to encode a highly textured, natural image, such as a field of grass at twilight, it may be advantageous to apply palette encoding to encode chrominance of the image and DCT to encode luminance. Such an image may include complex luminance data, but relatively few colors. As such, palette encoding may be advantageous for representing chrominance in order to represent a relatively small number of colors without a substantial loss in overall image quality. By contrast, because of the complex luminance in the image, a DCT or other frequency domain transform may be advantageous to encode the luminance for the image.

In other examples, it may be beneficial to use palette encoding to encode luminance and image transform techniques, such as DCT, to encode chrominance for a given image. For example, to encode a desktop image for a screen-sharing application, it may be advantageous to apply palette encoding to encode luminance of the image and DCT to encode chrominance. Such an image may include mostly straight lines and may not be highly textured. As such, palette encoding may be advantageous for representing luminance in order to represent a relatively small number of intensity values without a substantial loss in overall image quality. A DCT or other orthogonal image transform 130 may be advantageous to encode the chrominance for the image. Quantization factors may be selected in order to increase the compression of the chrominance channel representation of the image. In some examples, compressed representations of the image data resulting from palette encoding 110 and encoding technique 120 may be concatenated or otherwise combined to generate a frame of compressed image data including compressed representations of both chrominance values and luminance values.

Figure 2:
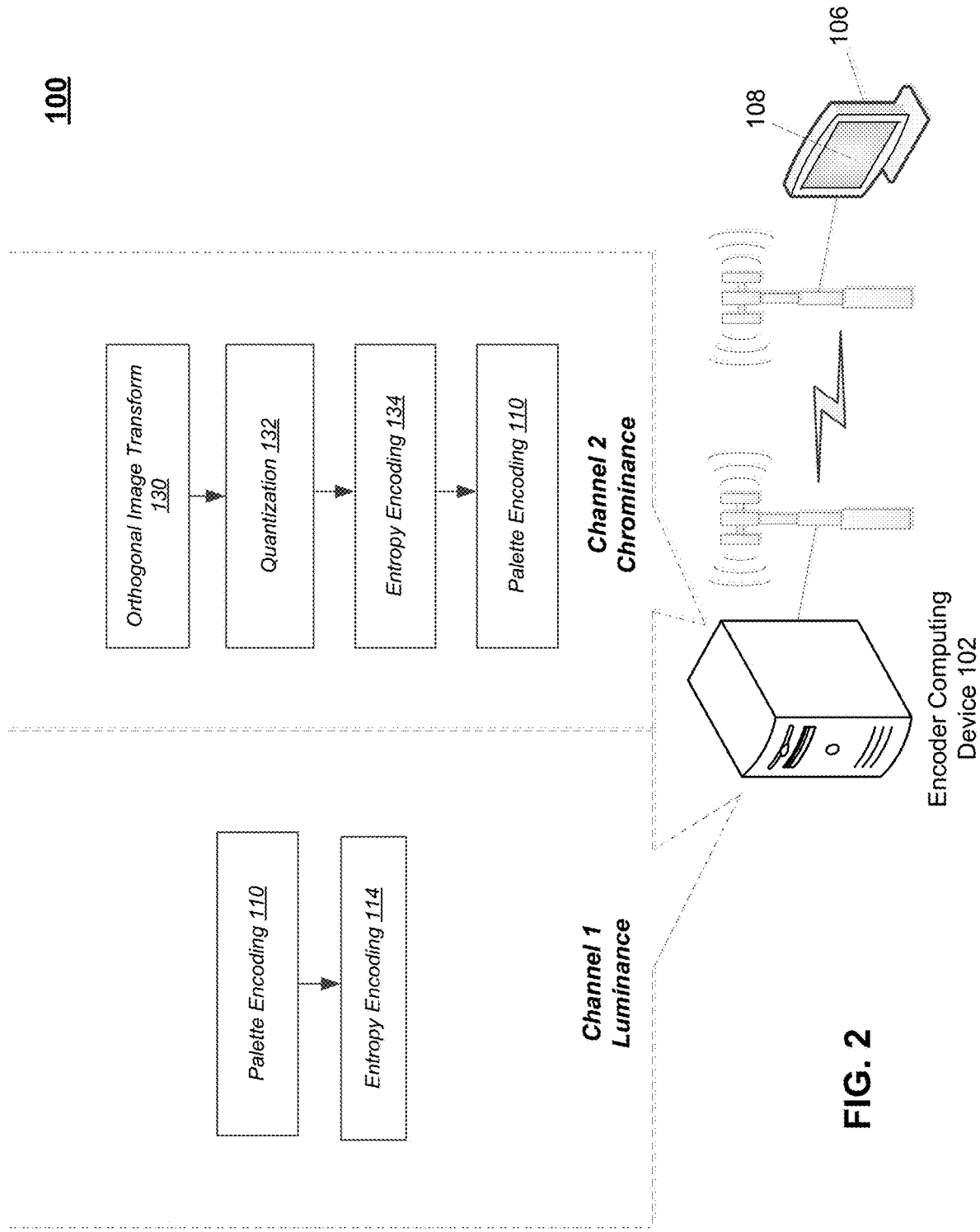
FIG. 2 depicts the example system of FIG. 1, illustrating an example where palette encoding is performed following a frequency domain based image transform, in accordance with embodiments of the present disclosure.

FIG. 2 depicts the example system of FIG. 1, illustrating an example where palette encoding is performed following a frequency domain based image transform, in accordance with various aspects of the present disclosure. Those components of FIG. 2 that have been described previously in reference to FIG. 1 may not be described again herein for purposes of brevity and clarity.

In the example depicted in FIG. 2, Channel 2 image data (e.g., chrominance data) may initially be subjected to an orthogonal image transform 130. For example, a DCT may be applied to the Channel 2 image data. Thereafter, a quantization process 132 and entropy encoding process 134 may be applied to compress the channel 2 image data. In some examples, the entropy encoded data resulting from entropy encoding process 134 may be decoded to produce a decoded frame of image data. Thereafter, palette encoding 110 may be applied to the decoded frame of Channel 2 image data to further compress the image data in terms of a number of bits used to represent the image data.

As shown in FIG. 2, Channel 1 image data (e.g., luminance) may be subjected to palette encoding 110 followed by entropy encoding 114. Optionally, Channel 1 image data may be subjected to orthogonal image transform 130, quantization process 132, and entropy encoding 134 prior to application of palette encoding 110, similar to the channel 2 image data of FIG. 2. As previously described, depending on the content of the image data, it may be advantageous to use different compression techniques for different channels of image data. For example, as human vision is less sensitive to changes in chrominance relative to changes in luminance, it may be advantageous to subsample and/or quantize chrominance values resulting in a highly compressed chrominance representation of an image while at the same time preserving high resolution luminance values of the image. Encoder computing device 102 may use different compression techniques and different combinations of compression techniques separately for each of the luminance and chrominance channels during encoding. The different techniques and/or combinations of techniques may be selected based on a particular application or based on the relative complexities of the chrominance data and luminance data present in the image and/or video.

Figure 3:
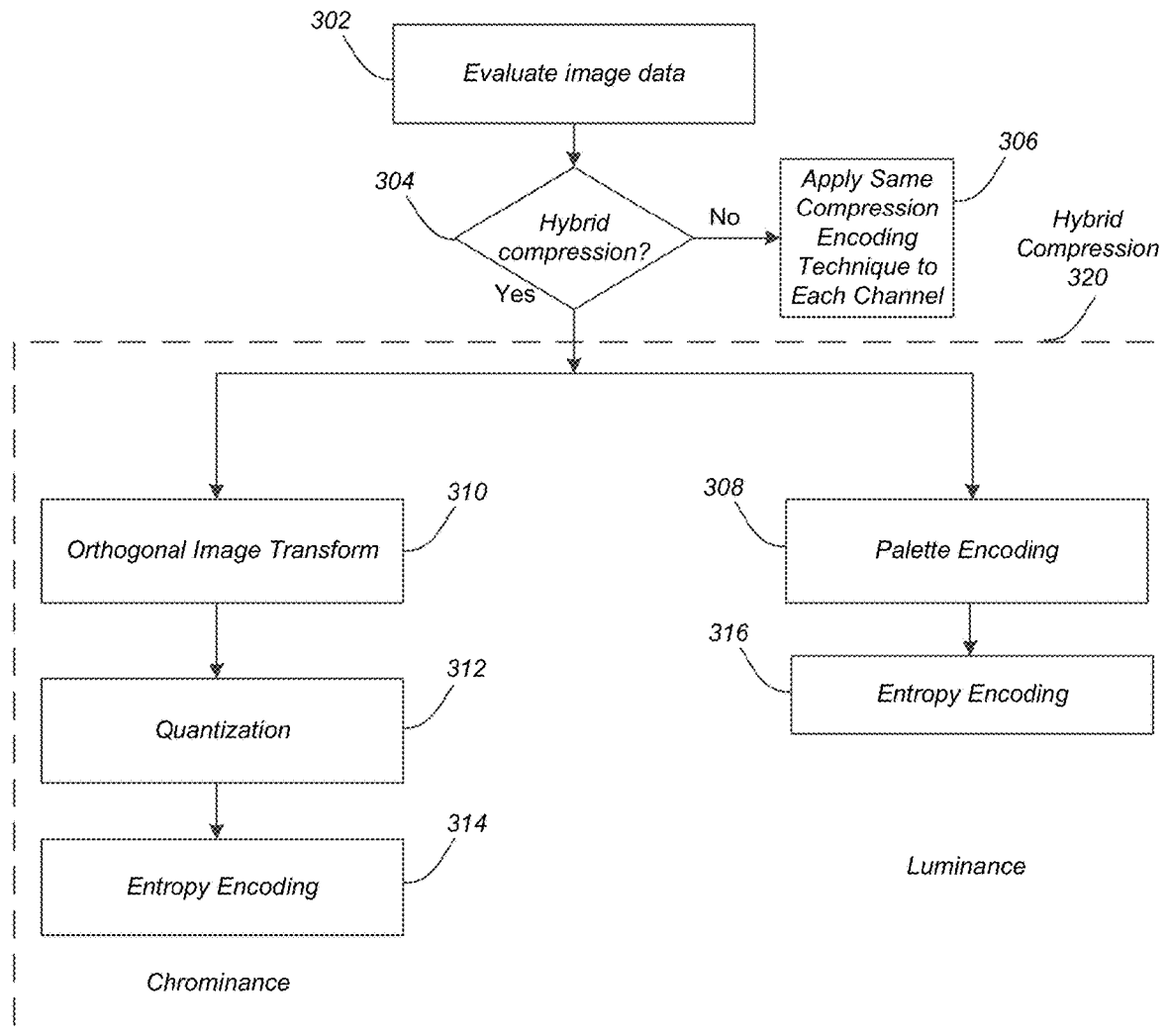
FIG. 3 depicts an example process for implementing hybrid compression encoding of image data that may be used in accordance with embodiments of the present disclosure.

FIG. 3 depicts an example process for implementing hybrid compression encoding of image data that may be used in accordance with the present disclosure.

The process depicted in FIG. 3 may begin at action 302, "Evaluate image data". At action 302, the image data may be evaluated to determine the degree of complexity of the chrominance channel and/or luminance channel in the image data. In some examples, a computing device, such as encoder computing device 102 depicted in FIG. 1, may determine the degree of complexity of the chrominance and/or luminance values of the image data by determining the prevalence of high frequency components for a particular channel of the image data. In some further examples, encoder computing device 102 may examine edges for high frequency components in the particular channel. Further, the encoder computing device 102 may measure macroblock variances for the particular channel to determine the relative complexity of the image data for the channel being examined.

In some other examples, a computing device, such as encoder computing device 102 depicted in FIG. 1, may encode a first channel of image data (e.g., luminance) using a full quality palette and may encode a second channel of image data (e.g., chrominance) using a DCT with high quantization factors scaled using, for example, the rate control algorithm. The two compressed channels of image data may be combined into a first compressed representation of the image data and the first compressed representation may be stored in a memory. Subsequently, encoder computing device 102 may encode the second channel (e.g., chrominance) using a full quality palette and may encode the first channel (e.g., luminance) using a DCT with high quantization factors scaled using the rate control algorithm. The two compressed channels of image data may be combined into a second compressed representation of the image data and the second compressed representation may be stored in a memory. Thereafter, encoder computing device 102 may compare the first compressed representation and the second compressed representation to determine the best hybrid compression technique to use in order to compress the particular image. In various examples, PSNR, SSIM, and/or frame size may be used to compare the first and the second compressed representations. In further examples, encoder computing device 102 may encode the first compressed representation and the second compressed representation at a low resolution in order to conserve processing resources during the hybrid compression testing procedure described above.

In yet other examples, a computing device, such as encoder computing device 102 depicted in FIG. 1, may determine that image data includes a relatively small number of colors. In an example, the computing device may make such a determination by comparing the number of colors present in the image data to a threshold number of colors. In some other examples, the computing device may determine that the variance of chrominance values exceeds a threshold value, indicating that the image data includes complex chrominance data. Similarly, the computing device may determine that the variance in luminance values exceeds a threshold value, indicating that the image data includes complex luminance data. Such determinations may be made at the frame level of image data or at the block level of image data, depending on the particular implementation.

At action 304, a determination may be made as to whether or not to use hybrid compression techniques to encode the image data. For example, a computing device, such as encoder computing device 102 depicted in FIG. 1, may determine that hybrid compression may be advantageous when the image data includes complex, highly textured luminance data and relatively simple chrominance data. The relative degree of complexity of the luminance and chrominance channels may be determined using various techniques described above. For example, an encoder computing device 102 (depicted in FIG. 1), or other computing device, may perform an orthogonal image transform to determine the number of blocks in image data that include high frequency image data and may compare the number of blocks to a threshold number of blocks. At action 304, if a determination is made that hybrid compression is not advantageous, for example when an image comprises highly complex chrominance and luminance data, the process may proceed to action 306 wherein the same compression encoding technique may be applied to both the luminance and chrominance channels.

Conversely, at action 304, if a determination is made that hybrid compression would be advantageous, for example, when an image comprises highly complex luminance data, but relatively simple chrominance data, the process may proceed with hybrid compression 320.

In the example depicted in FIG. 3, processing may proceed from action 304 to action 310 in the chrominance channel and from action 304 to action 308 in the luminance channel. At action 308, palette encoding may be used to encode luminance data for the image data being encoded. For example, a palette may be created for a number of luminance values (e.g., $2^x$ luminance values, where x is an integer) with each luminance value being associated with an index value of the palette. Pixel data of the image data being encoded may store an index value that points to a corresponding luminance value in the palette.

Processing may proceed from action 308 to action 310 in the luminance channel. At action 310, entropy encoding may be used to further compress the number of bits required to represent index values in the compressed pixel data resulting from palette encoding 308. For example, binary arithmetic encoding and/or Huffman encoding can be employed to reduce the number of bits necessary to represent the index values in the compressed image data resulting from palette encoding 308.

At action 310, a frequency domain based image transform may be used to encode chrominance data for the image data being encoded. For example, a DCT may be used to represent chrominance values of the image data in the frequency domain. The coefficients generated using the frequency domain based image transform from action 310 may be quantized at action 312. In some examples, high quantization factors may be used for chrominance due to the relative insensitivity of the human visual system to changes in chrominance, in order to reduce the size of the encoded chrominance data, in terms of a number of bits needed to represent the data. Entropy encoding, such as Huffman encoding or binary arithmetic encoding may be performed at action 314 to further reduce the number of bits needed to represent the chrominance data of the image data being compressed.

Figure 4:
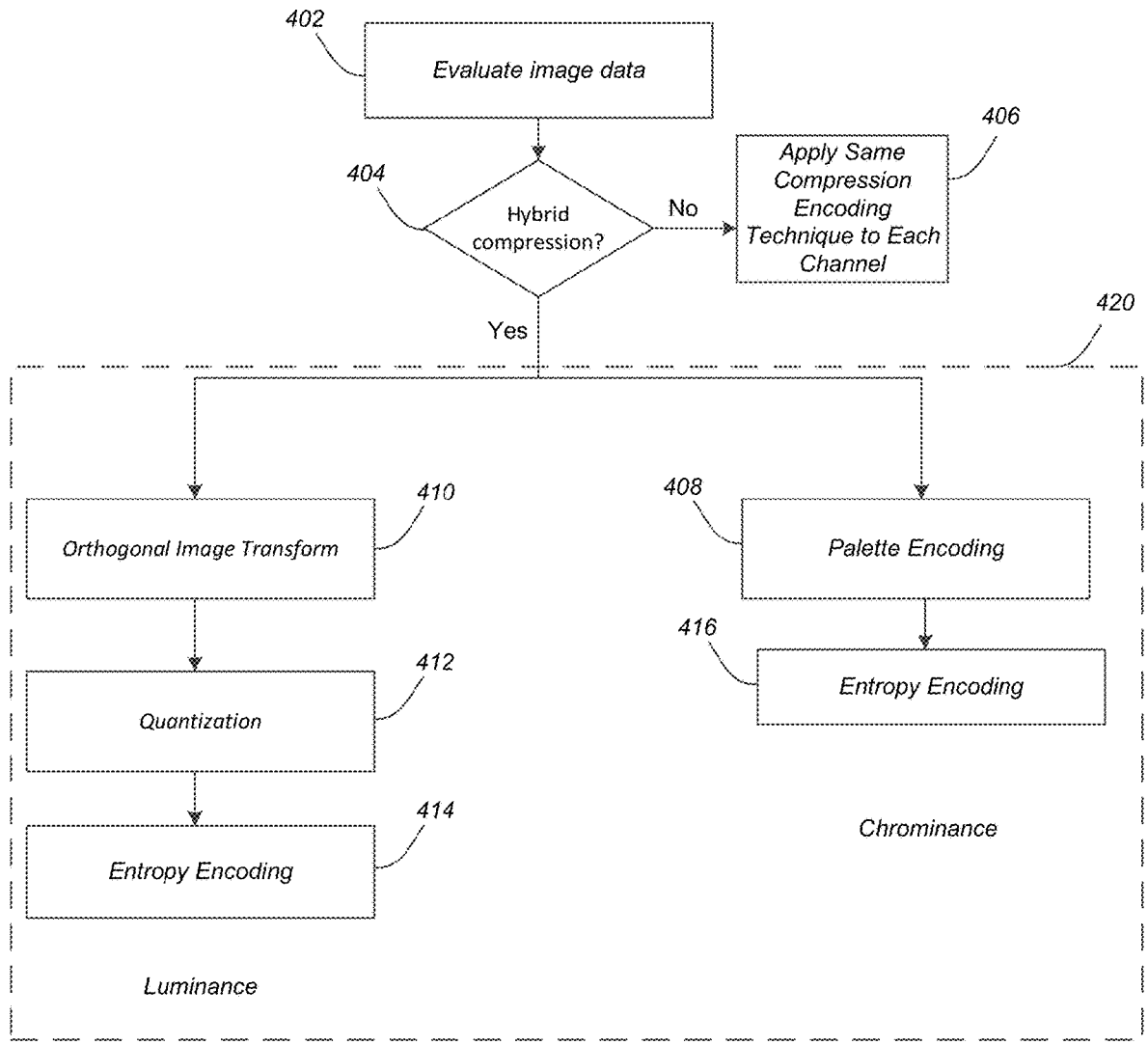
FIG. 4 depicts another example process for implementing hybrid compression encoding of image data that may be used in accordance with embodiments of the present disclosure.

FIG. 4 depicts another example process for implementing hybrid compression encoding of image data that may be used in accordance with the present disclosure.

The process depicted in FIG. 4 may begin at action 402, "Evaluate image data". At action 402, the image data may be evaluated to determine the relative complexities of the chrominance channel and luminance channel in the image. In some examples, a computing device, such as encoder computing device 102 depicted in FIG. 1, may determine the degree of complexity of the chrominance and/or luminance values of the image data by determining the prevalence of high frequency components for a particular channel of the image data. In some further examples, encoder computing device 102 may examine edges for high frequency components in the particular channel. Further, the encoder computing device 102 may measure macroblock variances for the particular channel to determine the relative complexity of the image data for the channel being examined.

In some other examples, a computing device, such as encoder computing device 102 depicted in FIG. 1, may encode a first channel of image data (e.g., chrominance) using a full quality palette and may encode a second channel of image data (e.g., luminance) using a DCT with high quantization factors scaled using, for example, the rate control algorithm. The two compressed channels of image data may be combined into a first compressed representation of the image data and the first compressed representation may be stored in a memory. Subsequently, encoder computing device 102 may encode the second channel (e.g., luminance) using a full quality palette and may encode the first channel (e.g., chrominance) using a DCT with high quantization factors scaled using the rate control algorithm. The two compressed channels of image data may be combined into a second compressed representation of the image data and the second compressed representation may be stored in a memory. Thereafter, encoder computing device 102 may compare the first compressed representation and the second compressed representation to determine the best hybrid compression technique to use in order to compress the particular image. In various examples, PSNR, SSIM, and/or frame size may be used to compare the first and the second compressed representations. In further examples, encoder computing device 102 may encode the first compressed representation and the second compressed representation at a low resolution in order to conserve processing resources during the hybrid compression testing procedure described above.

In still other examples, a computing device, such as encoder computing device 102 depicted in FIG. 1, may determine that image data includes a relatively small number of colors. In an example, the computing device may make such a determination by comparing the number of colors present in the image data to a threshold number of colors. In some other examples, the computing device may determine that the variance of chrominance values exceeds a threshold value, indicating that the image data includes complex chrominance data. Similarly, the computing device may determine that the variance in luminance values exceeds a threshold value, indicating that the image data includes complex luminance data.

At action 404, a determination may be made as to whether or not to use hybrid compression techniques to encode the image data. For example, a computing device, such as encoder computing device 102 depicted in FIG. 1, may determine that hybrid compression may be advantageous when the image data includes complex, highly textured luminance data and relatively simple chrominance data. At action 304, if a determination is made that hybrid compression is not advantageous, for example, when an image comprises highly complex chrominance and luminance data, the process may proceed to action 306 wherein the same compression encoding technique may be applied to both the luminance and chrominance channels.

Conversely, at action 404, if a determination is made that hybrid compression would be advantageous, for example, when an image comprises highly complex luminance data, but relatively simple chrominance data, the process may proceed with hybrid compression 420.

In the example depicted in FIG. 4, processing may proceed from action 404 to action 410 in the luminance channel and from action 404 to action 408 in the chrominance channel. At action 408, palette encoding may be used to encode chrominance data for the image data being encoded. For example, a palette may be created for a number of chrominance values (e.g., $2^x$ chrominance values, where x is an integer, or some other number of values) with each chrominance value being associated with an index value of the palette. Pixel data of the image data being encoded may store an index value that points to a corresponding chrominance value in the palette.

Processing may proceed from action 408 to action 416 in the chrominance channel. At action 416, entropy encoding may be used to further compress the number of bits required to represent index values in the compressed pixel data resulting from palette encoding 408. For example, binary arithmetic encoding and/or Huffman encoding can be employed to reduce the number of bits necessary to represent the index values in the compressed image data resulting from palette encoding 408.

At action 410, an orthogonal image transform, such as a frequency domain based image transform, may be used to encode luminance data for the image data being encoded. For example, a DCT may be used to represent luminance values of the image data in the frequency domain. The coefficients generated using the frequency domain based image transform from action 410 may be quantized at action 412. In some examples, luminance coefficients may not be as highly quantized as chrominance coefficients due to the relative sensitivity of the human visual system to changes in luminance versus changes in chrominance. Accordingly, in at least some examples, quantization factors (e.g., elements of quantization tables) for luminance coefficients may be lower than quantization factors for chrominance coefficients. Entropy encoding, such as Huffman encoding, may be performed at action 414 to further reduce the number of bits needed to represent the luminance data of the image data being compressed.

Among other potential benefits, hybrid compression encoding of image data may increase the quality of compressed images while reducing the size of the images, in terms of a number of bits. Chrominance values of images may be highly quantized after a frequency domain based image transform to reduce the number of bits needed to store chrominance data of the image. However, overall image quality may not subjectively appear to suffer as human vision is not very sensitive to changes in chrominance. At the same time, luminance values may be encoded using palette encoding. The luminance palette may be generated in order to preserve the desired number of luminance values in the decoded image data. In some other examples, image data may include relatively simple luminance data and complex chrominance data. In such examples, palette encoding may be used to encode chrominance data while a DCT or other frequency domain based image transform may be used to encode luminance data. Furthermore, in some examples, chrominance data may be encoded and decoded using a DCT or other frequency domain based image transform. Thereafter, palette encoding or other frequency domain based image transforms may be applied to the reconstructed color image for finalizing and bit-packing the resultant image data.

Figure 5:
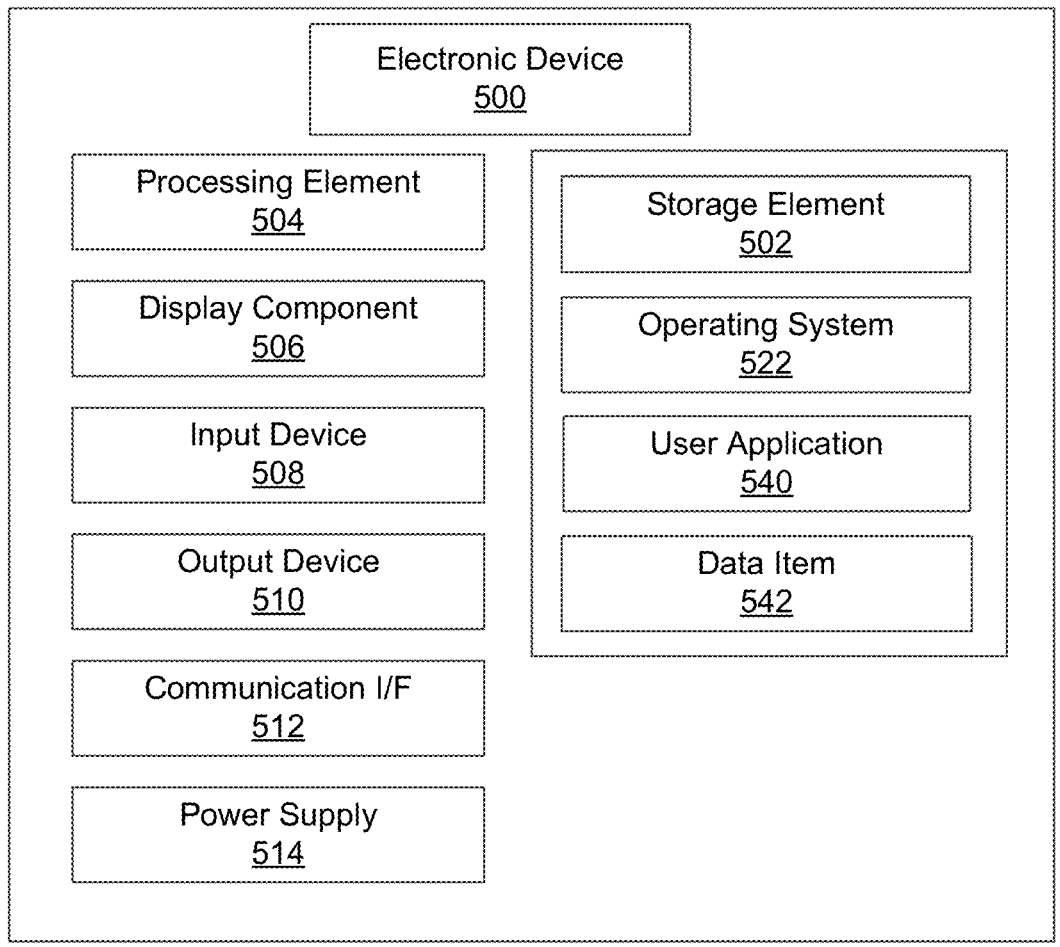
FIG. 5 illustrates an example block diagram of an electronic device 500, in accordance with embodiments of the present disclosure.

FIG. 5 illustrates an example block diagram of an electronic device 500, in accordance with various embodiments of the present disclosure. The electronic device 500 may be implemented as any of a number of electronic devices, such as an e-book reader, a tablet computing device, a smartphone, a media player, a portable gaming device, a portable digital assistant, a laptop computer, a desktop computer, and other devices providing media presentation functionality. It should be understood that various types of computing devices including a processing element, a memory, and a user interface for receiving user input can be used in accordance with various embodiments discussed herein.

The electronic device 500 may include a display component 506. The display component 506 may comprise, for example, one or more devices such as cathode ray tubes (CRTs), liquid crystal display (LCD) screens, gas plasma-based flat panel displays, LCD projectors, or other types of display devices, etc. The electronic device 500 may include one or more input devices 508 operable to receive inputs from a user. The input devices 508 can include, for example, a push button, touch pad, touch screen, wheel, joystick, keyboard, mouse, trackball, keypad, accelerometer, light gun, game controller, or any other such device or element whereby a user can provide inputs to the electronic device 500. These input devices 508 may be incorporated into the electronic device 500 or operably coupled to the electronic device 500 via wired or wireless interface. For computing devices with touch sensitive displays, the input devices 508 can include a touch sensor that operates in conjunction with the display component 506 to permit users to interact with the image displayed by the display component 506 using touch inputs (e.g., with a finger or stylus). The electronic device 500 may also include an output device 510, such as one or more audio speakers.

The electronic device 500 may also include at least one communication interface 1512 comprising one or more wireless components operable to communicate with one or more separate devices within a communication range of the particular wireless protocol. The wireless protocol can be any appropriate protocol used to enable devices to communicate wirelessly, such as Bluetooth, cellular, IEEE 802.11, or infrared communications protocols, such as an IrDA-compliant protocol. It should be understood that the electronic device 500 may also include one or more wired communications interfaces for coupling and communicating with other devices, such as a USB port. The electronic device 500 may also include a power supply 514, such as, for example, a rechargeable battery operable to be recharged through conventional plug-in approaches, or through other approaches such as capacitive charging.

The electronic device 500 may also include a processing element 504 for executing instructions and retrieving data stored in a storage element 502 or memory. As would be apparent to one of ordinary skill in the art, the storage element 502 can include one or more different types of non-transitory memory, data storage, or computer-readable storage media, such as, for example, a first data storage for program instructions for execution by the processing element 504 and a second data storage for images or data and/or a removable storage for transferring data to other devices. The storage element 502 may store software for execution by the processing element 504, such as, for example, operating system software 522 and user applications 540. The storage element 502 may also store a data item 542, such as, for example, data files corresponding to one or more applications 540.

Although various systems described herein may be embodied in software or code executed by general-purpose hardware as discussed above, as an alternative, the same may also be embodied in dedicated hardware or a combination of software/general-purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and, consequently, are not described in detail herein. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system, such as a processing component in a computer system. If embodied in hardware, each block may represent a circuit or a number of interconnected circuits to implement the specified logical function(s).

Although the processes, flowcharts, and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is to be understood that all such variations are within the scope of the present disclosure.

Also, any logic or application described herein that comprises software or code can be embodied in any non-transitory computer-readable medium for use by or in connection with an instruction execution system, such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. A system comprising:
   at least one processor; and
   at least one non-transitory computer-readable memory storing instructions that, when executed by the at least one processor, program the at least one processor to:
   receive image data;
   using a chrominance palette comprising a plurality of chrominance values and a plurality of index values, generate a first compressed representation of a first chrominance value of the image data by representing the first chrominance value by a first index value of the chrominance palette, wherein the first chrominance value of the plurality of chrominance values is associated with the first index value of the plurality of index values;
   generate a second compressed representation of a luminance value of the image data by applying an orthogonal image transform to the luminance value;
   generate a compressed frame of image data based at least in part on the first compressed representation and the second compressed representation; and
   send the compressed frame of image data over a communication network to a computing device.

2. The system of claim 1, the at least one non-transitory computer-readable memory storing further instructions that, when executed by the at least one processor, further program the at least one processor to:
   determine the first chrominance value of the image data based at least in part on the luminance value.

3. The system of claim 1, the at least one non-transitory computer-readable memory storing further instructions that, when executed by the at least one processor, further program the at least one processor to:
   determine the first chrominance value of the image data based at least in part on the luminance value and a value of a red color signal or a value of a blue color signal.

4. The system of claim 1, the at least one non-transitory computer-readable memory storing further instructions that, when executed by the at least one processor, further program the at least one processor to:
   generate at least one quantized luminance value for a frame of the image data.

5. The system of claim 1, the at least one non-transitory computer-readable memory storing further instructions that, when executed by the at least one processor, further program the at least one processor to:
   generate at least one quantized luminance value for a block of the image data.

6. The system of claim 1, the at least one non-transitory computer-readable memory storing further instructions that, when executed by the at least one processor, further program the at least one processor to:
   generate a third compressed representation of a second luminance value of the image data by representing a third luminance value of the compressed frame of image data with reference to a luminance palette.

7. The system of claim 1, the at least one non-transitory computer-readable memory storing further instructions that, when executed by the at least one processor, further program the at least one processor to:
   generate pixel data for a first pixel of the image data, the pixel data comprising the first index value to the chrominance palette.

8. The system of claim 1, the at least one non-transitory computer-readable memory storing further instructions that, when executed by the at least one processor, further program the at least one processor to:
   evaluate a luminance channel of the image data to determine a degree of complexity of the luminance channel of the image data; and
   based at least in part on the degree of complexity, use the orthogonal image transform to compress the luminance value of the image data, wherein the orthogonal image transform comprises a frequency domain-based image transform.

9. The system of claim 1, the at least one non-transitory computer-readable memory storing further instructions that, when executed by the at least one processor, further program the at least one processor to:
   generate a quantized representation of the first compressed representation of the first chrominance value of the image data.

10. The system of claim 1, the at least one non-transitory computer-readable memory storing further instructions that, when executed by the at least one processor, further program the at least one processor to:
    generate a third compressed representation of the second compressed representation by applying an entropy encoding process to the second compressed representation.

11. A non-transitory computer-readable medium comprising instructions that, when executed by at least one processor, program the at least one processor to:

receive image data;
using a chrominance palette comprising a plurality of chrominance values and a plurality of index values, generate a first compressed representation of a first chrominance value of the image data by representing the first chrominance value of the image data by a first index value of the chrominance palette, wherein the first chrominance value of the plurality of chrominance values is associated with the first index value of the plurality of index values;
generate a second compressed representation of a luminance value of the image data by applying an orthogonal image transform to the luminance value;
generate a compressed frame of image data based at least in part on the first compressed representation and the second compressed representation; and
send the compressed frame of image data over a communication network to a computing device.

12. The non-transitory computer-readable medium of claim 11, comprising further instructions that, when executed by the at least one processor, further program the at least one processor to:
determine the first chrominance value of the image data based at least in part on the luminance value.

13. The non-transitory computer-readable medium of claim 11, comprising further instructions that, when executed by the at least one processor, further program the at least one processor to:
determine the first chrominance value of the image data based at least in part on the luminance value and a value of a red color signal or a value of a blue color signal.

14. The non-transitory computer-readable medium of claim 11, comprising further instructions that, when executed by the at least one processor, further program the at least one processor to:
generate at least one quantized luminance value for a frame of the image data.

15. The non-transitory computer-readable medium of claim 11, comprising further instructions that, when executed by the at least one processor, further program the at least one processor to:
generate a third compressed representation of a second luminance value of the image data by representing a third luminance value of the compressed frame of image data with reference to a luminance palette.

16. The non-transitory computer-readable medium of claim 11, comprising further instructions that, when executed by the at least one processor, further program the at least one processor to:
generate pixel data for a first pixel of the image data, the pixel data comprising the first index value to the chrominance palette.

17. The non-transitory computer-readable medium of claim 11, comprising further instructions that, when executed by the at least one processor, further program the at least one processor to:
evaluate a luminance channel of the image data to determine a degree of complexity of the luminance channel of the image data; and
based at least in part on the degree of complexity, use the orthogonal image transform to compress the luminance value of the image data, wherein the orthogonal image transform comprises a frequency domain-based image transform.

18. A system comprising:
at least one processor; and
at least one non-transitory computer-readable memory storing instructions that, when executed by the at least one processor, program the at least one processor to:
receive, over a communication network, a compressed frame of image data;
determine a first index value of the compressed frame of image data, the first index value corresponding to a chrominance palette, wherein the chrominance palette comprises a plurality of chrominance values and a plurality of index values;
determine that the first index value is associated with a first chrominance value in the chrominance palette;
determine a first luminance value associated with the compressed frame of image data by applying an inverse orthogonal image transform to the compressed frame of image data; and
generate a decoded frame of image data comprising the first chrominance value and the first luminance value.

19. The system of claim 18, the at least one non-transitory computer-readable memory storing further instructions that, when executed by the at least one processor, further program the at least one processor to:
apply an entropy decoding process to the compressed frame of image data.

20. The system of claim 18, the at least one non-transitory computer-readable memory storing further instructions that, when executed by the at least one processor, further program the at least one processor to:
determine a second index value of the compressed frame of image data, the second index value corresponding to a luminance palette, wherein the luminance palette comprises a second plurality of luminance values and a second plurality of index values; and
determine that the second index value is associated with a second luminance value in the luminance palette, wherein the decoded frame of image data comprises the second luminance value.

* * * * *